(12) United States Patent
Kupfernagel

(10) Patent No.: US 9,400,327 B2
(45) Date of Patent: Jul. 26, 2016

(54) METHOD FOR PRODUCING AN ULTRASONIC SENSOR FOR A MOTOR VEHICLE, ULTRASONIC SENSOR AND MOTOR VEHICLE

(71) Applicant: VALEO Schalter und Sensoren GmbH, Bietigheim-Bissingen (DE)

(72) Inventor: Uwe Kupfernagel, Vaihingen an der Enz (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 58 days.

(21) Appl. No.: 14/417,259

(22) PCT Filed: Jul. 23, 2013

(86) PCT No.: PCT/EP2013/065475
§ 371 (c)(1),
(2) Date: Jan. 26, 2015

(87) PCT Pub. No.: WO2014/016276
PCT Pub. Date: Jan. 30, 2014

(65) Prior Publication Data
US 2015/0212203 A1    Jul. 30, 2015

(30) Foreign Application Priority Data

Jul. 27, 2012   (DE) .......................... 10 2012 014 932

(51) Int. Cl.
| | | |
|---|---|---|
| *G01S 7/521* | (2006.01) | |
| *G10K 9/22* | (2006.01) | |
| *G10K 9/122* | (2006.01) | |

(52) U.S. Cl.
CPC ................. *G01S 7/521* (2013.01); *G10K 9/122* (2013.01); *G10K 9/22* (2013.01); *Y10T 29/49005* (2015.01)

(58) Field of Classification Search
CPC ........... G10K 9/122; G10K 9/22; G01S 7/521
See application file for complete search history.

(56) References Cited

U.S. PATENT DOCUMENTS

| | | | | |
|---|---|---|---|---|
| 7,929,377 B2 * | 4/2011 | Wehling | .................... | G10K 9/22 367/140 |
| 8,596,139 B2 * | 12/2013 | Mueller | ................ | B06B 1/0655 73/861.18 |
| 2002/0130770 A1 | 9/2002 | Keyworth et al. | | |

(Continued)

FOREIGN PATENT DOCUMENTS

| | | |
|---|---|---|
| DE | 101 25 272 A1 | 11/2002 |
| DE | 102 60 118 A1 | 7/2004 |

(Continued)

OTHER PUBLICATIONS

International Search Report for corresponds to International Application No. PCT/EP2013/065475, mailed Jan. 31, 2014 (5 pages).

(Continued)

*Primary Examiner* — Daniel Pihulic
(74) *Attorney, Agent, or Firm* — Osha Liang LLP

(57) ABSTRACT

A method for producing an ultrasonic sensor for a motor vehicle is disclosed. The method involves providing a sensor housing, a membrane for emitting and/or receiving ultrasonic signals, and a decoupling element, which is arranged between the sensor housing and the membrane, the decoupling element being injection-moulded onto an inner surface of the sensor housing and the membrane being subsequently inserted into the sensor housing.

11 Claims, 3 Drawing Sheets

(56) References Cited

U.S. PATENT DOCUMENTS

2009/0196121 A1* 8/2009 Wehling ............... G10K 9/22
367/87
2011/0314933 A1* 12/2011 Mueller ............... B06B 1/0655
310/327
2015/0212203 A1* 7/2015 Kupfernagel .......... G10K 9/122
367/140

FOREIGN PATENT DOCUMENTS

| DE | 10 2006 028 214 A1 | 12/2007 |
|----|--------------------|---------|
| DE | 10 2007 043 500 A1 | 3/2009 |
| DE | 10 2008 062 011 A1 | 6/2010 |
| DE | 10 2008 055 126 A1 | 7/2010 |
| DE | 10 2009 024 065 A1 | 12/2010 |
| DE | 10 2011 001 669 A1 | 11/2011 |

OTHER PUBLICATIONS

Search Report for corresponding German Application No. 10 2012 014 932.8, mailed Sep. 19, 2012 (5 pages).

* cited by examiner

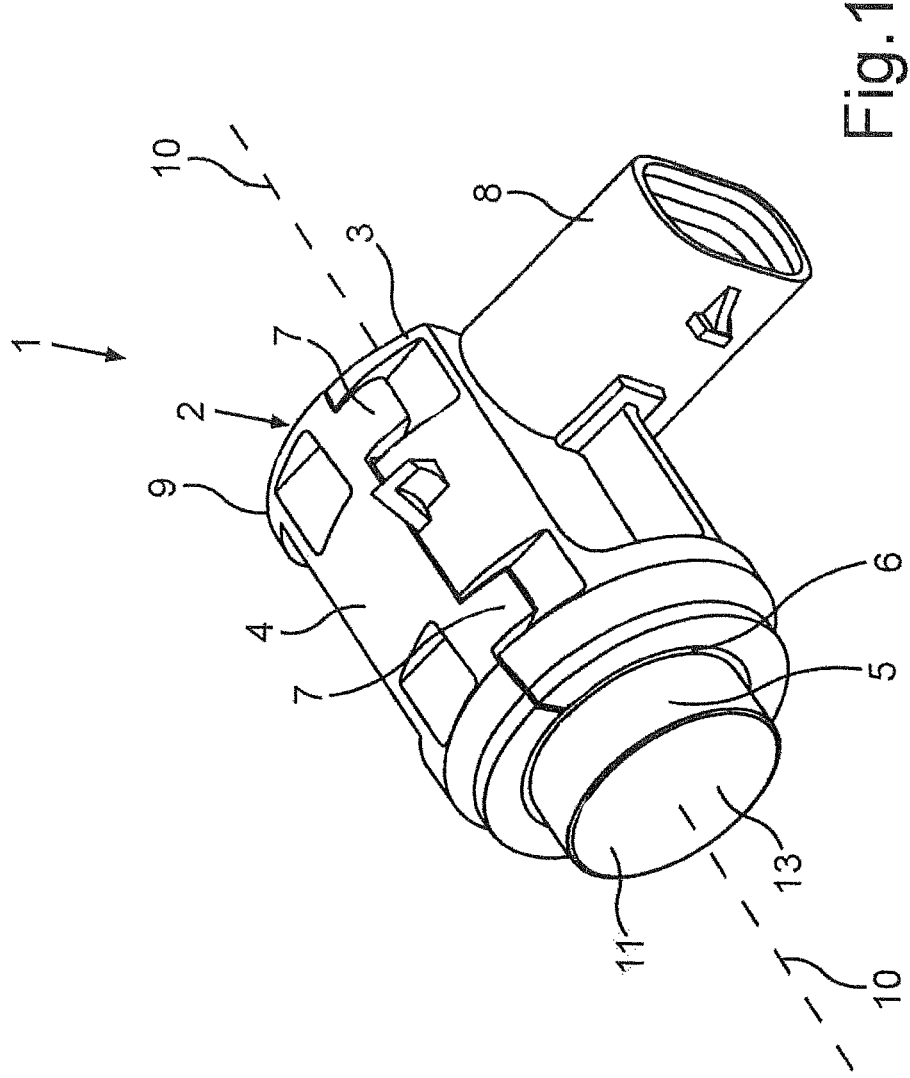

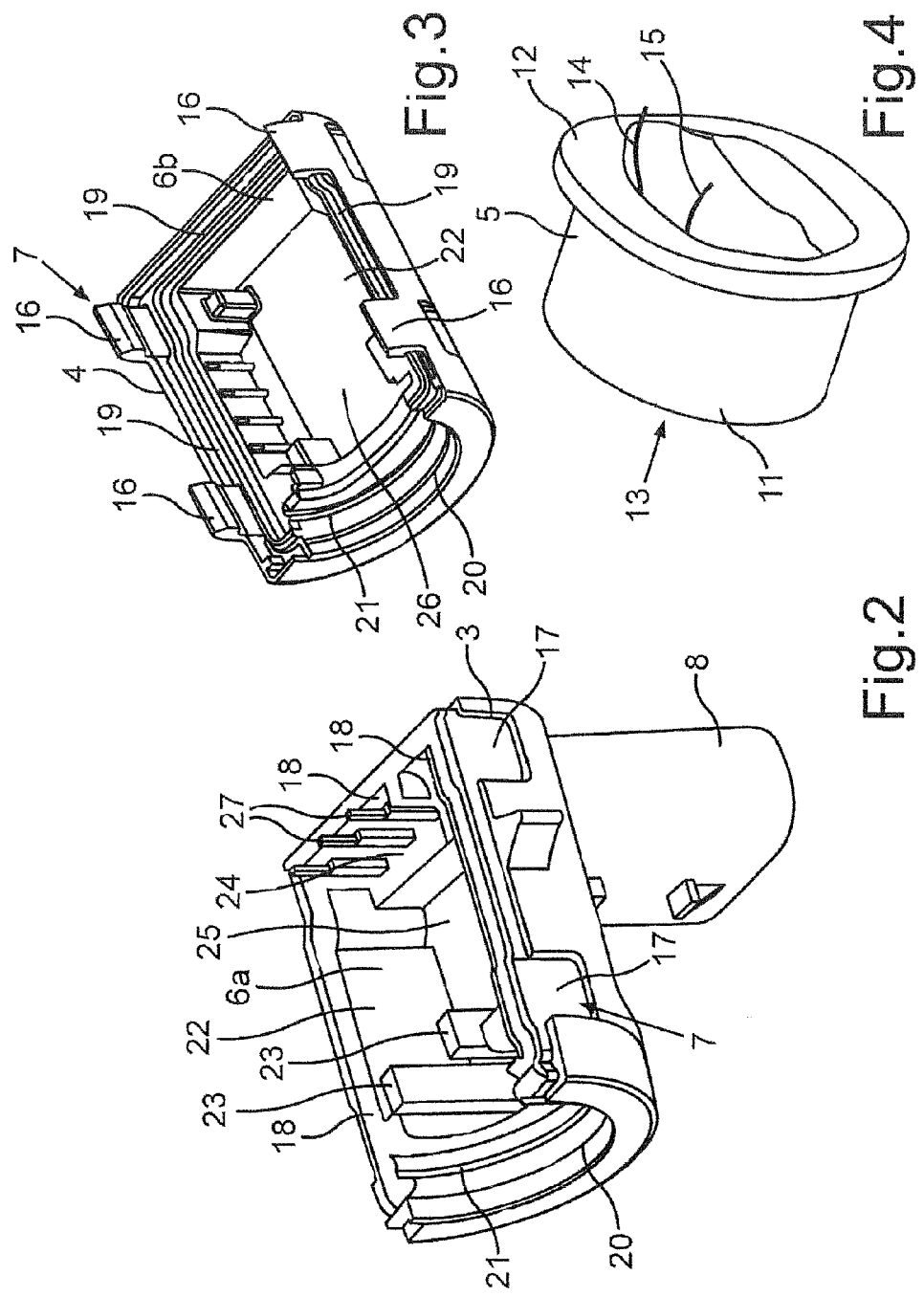

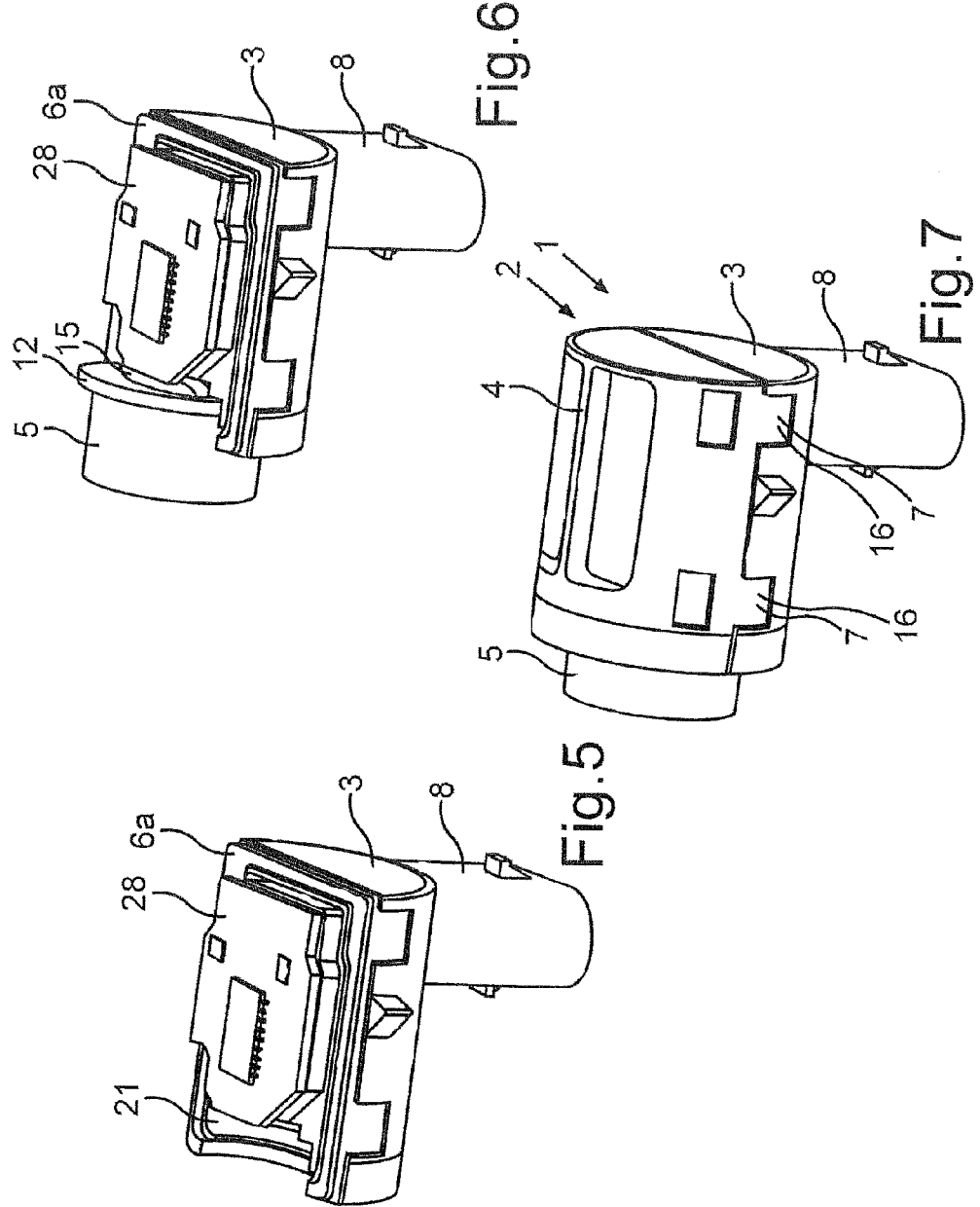

METHOD FOR PRODUCING AN ULTRASONIC SENSOR FOR A MOTOR VEHICLE, ULTRASONIC SENSOR AND MOTOR VEHICLE

The invention relates to a method for producing an ultrasonic sensor for a motor vehicle by providing a sensor housing, a membrane for emitting and/or receiving ultrasonic signals, and also a decoupling element, which is arranged between the sensor housing and the membrane for decoupling the membrane from the sensor housing in terms of vibration. The invention also relates to an ultrasonic sensor, and also to a motor vehicle with such a sensor.

Ultrasonic sensors for motor vehicles are already known from the prior art. They are usually a component part of a system known as a parking aid, which serves for assisting the driver in carrying out manoeuvres with the motor vehicle, to be specific in particular when parking in a parking space or when leaving the parking space. A multiplicity of such ultrasonic sensors are generally used, arranged on the front and rear bumpers of the motor vehicle such that they are distributed in the transverse direction of the vehicle.

An ultrasonic sensor serves for measuring the distance between the motor vehicle on the one hand and an obstacle in its vicinity on the other hand. For this purpose, an ultrasonic signal is emitted with the aid of a membrane, which for this purpose is induced to undergo mechanical vibration by means of a piezo element. The emitted ultrasonic signal is then reflected at the obstacle and returns to the ultrasonic sensor as an echo. The echo once again induces the membrane to undergo mechanical vibration, whereby an electrical voltage is also induced at the piezo element and is picked up by means of an electronic control device. The distance is then determined in dependence on the transit time of the ultrasonic signal.

Interest is now focused on producing an ultrasonic sensor or on designing the ultrasonic sensor. For decoupling the membrane from the sensor housing in terms of vibration, an element known as a decoupling element, which is for example formed from a soft-elastic material, is usually used. This decoupling element then has the task of decoupling the sensor housing, formed from plastic, from the mechanical vibration of the membrane. Such a decoupling element is known for example from the document DE 10 2006 028 214 A1. This decoupling element is arranged between the membrane on the one hand and the sensor housing on the other hand and has the function of holding the membrane in the housing and reducing the transmission of the vibrations of the membrane to the housing. The annular decoupling element is connected here to the sensor housing by way of latching means.

A method for producing an ultrasonic sensor of the generic type mentioned at the beginning is known from the document DE 101 25 272 A1. For producing the decoupling element, a liquid medium is injected or poured into an intermediate space between the membrane and the sensor housing.

The object of the invention is to provide a way in which the production of an ultrasonic sensor can be further simplified in comparison with the prior art.

This object is achieved according to the invention by a method, an ultrasonic sensor and also a motor vehicle with the features according to the respective independent patent claims. Advantageous embodiments of the invention are the subject of the dependent patent claims, the description and the figures.

In the case of a method according to the invention for producing an ultrasonic sensor for a motor vehicle, firstly the following components are provided: a sensor housing, a membrane and also a decoupling element. The decoupling element is arranged between the sensor housing and the membrane. According to the invention, it is provided that the decoupling element is injection-moulded onto an inner surface of the sensor housing and the membrane is subsequently inserted into the sensor housing. This makes the production of the ultrasonic sensor particularly simple, because there is no longer any need for an additional mounting step in the assembly of the ultrasonic sensor, to be specific the step of mounting the decoupling element. This is so because this decoupling element has already been injection-moulded on the inner side of the sensor housing, and so the assembly of the ultrasonic sensor is merely confined essentially to the insertion of the membrane, and possibly also a printed circuit board, into the sensor housing. It is also the case overall that fewer individual parts have to be provided and handled, and furthermore the assembly tolerances are reduced to a minimum.

The sensor housing is preferably formed by two housing shells that are separate from one another. These housing shells preferably represent two housing halves, which together form a hollow, cylindrical sensor housing. The two housing shells in this case preferably respectively represent a 180° sector of the cylindrical sensor housing. This means that the sensor housing is in particular divided into the two housing shells along a parting plane, which runs parallel to a longitudinal axis of the cylindrical sensor housing.

Therefore, the sensor housing may be formed by two housing shells that are separate from one another. In the case of this embodiment, consequently, the decoupling element is also preferably formed by two separate parts, in that a part of the decoupling element is respectively injection-moulded onto the respective inner surfaces of the two housing shells. This makes the assembly of the ultrasonic sensor possible without great effort. This is so because it is sufficient merely that the membrane is inserted between the two housing shells and clamped in place there by connecting the two housing shells.

In one embodiment, the insertion of the membrane into the sensor housing comprises the membrane first being inserted into the one housing shell and the two housing shells subsequently being connected to one another, and so the membrane is clamped in place between the two parts of the decoupling element. On the one hand, this makes the assembly of the ultrasonic sensor particularly simple; on the other hand, it also allows the membrane to be held between the two housing shells particularly reliably and without slipping. In particular, it may be provided here that a flange of the membrane that extends in the radial direction is inserted into the one housing shell at right angles to the inner surface of the sensor housing and is then covered from the other side by the other housing shell, and this has the overall effect that it is clamped between the two housing shells. A vibrating region of the membrane can in this case lie outside the sensor housing, to be specific protrude out of it by way of an axial opening in the end face of the sensor housing.

It proves to be advantageous if the two housing shells are connected to one another by way of latching means. On the one hand, the connection of the two housing shells is particularly reliable during operation; on the other hand, such a connection can also be realized particularly quickly, in that for example the one housing shell is pressed against the other housing shell and a latching lug engages in a corresponding latching opening.

It may be provided that, by the connection of the two housing shells, the membrane is fixed in the sensor housing with a form fit and/or force fit, between the parts on either side of the decoupling element. This allows a reliable and secure seating of the membrane in the sensor housing to be ensured, and so detachment of the membrane from the sensor housing is prevented.

For sealing the connecting location between the two housing shells, at least one of the parts of the decoupling element may have a corresponding seal. This may for example take the form that the one part of the decoupling element has in the region of the connecting location a groove or recess, in which a corresponding sealing tongue of the other part of the decoupling element is received when the two housing shells are connected. Consequently, connecting the housing shells has the effect that the two parts of the decoupling element are pressed against one another, and the sealing tongue then enters the corresponding recess in the other part of the decoupling element, whereby the sensor housing as a whole is sealed off from the outside. Consequently, the entire ultrasonic sensor is protected particularly securely from environmental influences.

Therefore, the decoupling element may be formed with a holding region for the force-fitting and/or form-fitting holding of the membrane. This holding region may be formed with a peripheral radial groove, in which a radial edge region of the membrane—and in particular of the aforementioned radial flange—is received to produce the form fit and/or the force fit. Such a peripheral groove achieves the effect that the membrane is reliably fixed in the sensor housing in the axial direction, and furthermore the entire sensor housing is also effectively sealed off from the outside at this location.

The decoupling element may, however, also have a second holding region, which is designed for holding a printed circuit board—with electronic elements arranged on it. This second holding region may be arranged axially offset with respect to the first holding region for holding the membrane, and so the printed circuit board can be arranged alongside the membrane in the axial direction. This has the result of providing a multifunctional decoupling element which, apart from the decoupling in terms of vibration and apart from the function of holding the membrane, also additionally has the function of securing the printed circuit board. Consequently, the printed circuit board is also arranged in a reliably sealed-off region, and furthermore the transmission of the mechanical vibration to this printed circuit board can be prevented. The securing of the printed circuit board may take place in such a way that it is arranged essentially parallel to the longitudinal axis of the cylindrical sensor housing, and so the printed circuit board lies in a parting plane between the two housing shells and is covered on the one hand by the one housing shell and on the other hand by the other housing shell.

An ultrasonic sensor according to the invention for a motor vehicle comprises a sensor housing, a membrane and also a decoupling element, which is arranged between the sensor housing and the membrane. The decoupling element is injection-moulded on an inner surface of the sensor housing as an injection-moulded part, and the sensor housing has two housing shells that are separate from one another, between which the membrane is clamped in place.

A motor vehicle according to the invention comprises an ultrasonic sensor according to the invention.

The preferred embodiments presented with respect to the method according to the invention and their advantages apply correspondingly to the ultrasonic sensor according to the invention and also to the motor vehicle according to the invention.

Further features of the invention are provided by the claims, the figures and the description of the figures. All of the features and combinations of features that are mentioned above in the description and also the features and combinations of features that are mentioned below in the description of the figures and/or are shown in the figures alone can be used not only in the combination respectively specified but also in other combinations or else on their own.

The invention is now explained in more detail on the basis of a preferred exemplary embodiment, and with reference to the accompanying drawings. It should be emphasized that the exemplary embodiment described below represents a preferred embodiment of the invention and the invention is consequently not restricted to this exemplary embodiment.

In the drawings:

FIG. 1 shows an ultrasonic sensor according to one embodiment of the invention in a schematic and perspective representation;

FIGS. 2 to 4 show various components of the ultrasonic sensor according to FIG. 1 in a schematic and perspective representation; and FIGS. 5 to 7 show a process for assembling the ultrasonic sensor in a schematic and perspective representation.

In FIG. 1, an ultrasonic sensor 1 according to one embodiment of the invention is shown in more detail in a schematic and perspective representation. The ultrasonic sensor 1 has a sensor housing 2, which in the exemplary embodiment consists of two housing shells 3, 4. Held in the sensor housing 2 is a membrane 5, which is fastened in the sensor housing 2 with the aid of a decoupling element 6. The decoupling element 6 also has the function of decoupling the sensor housing 2 from the membrane 5 in terms of vibration.

The two housing shells 3, 4 are connected to one another by way of latching means 7. The sensor housing has a connecting region 8, by way of which the ultrasonic sensor 1 can be electrically connected to an electronic control device of a motor vehicle. Apart from the connecting region 8, the sensor housing 2 has a cylindrical region 9, the two housing shells 3, 4 essentially representing two 180° sectors of a cylinder. A separation between the two housing shells 3, 4 therefore takes place along a plane that runs parallel to a longitudinal axis 10 of the cylindrical region 9 of the sensor housing 2, it also being possible for this longitudinal axis 10 to lie in the separating plane mentioned. Consequently, the two housing shells 3, 4, divided along the longitudinal axis 10, are as it were housing halves of the sensor housing 2.

As revealed by FIG. 1, the membrane 5 has a vibrating region 11, which protrudes out of the sensor housing 2.

Referring to FIG. 4, the membrane 5 is formed in an essentially cylindrical and pot-like fashion and, apart from the vibrating region 11, also has a flange 12, which protrudes radially outwards from the vibrating region 11. On the one hand, the membrane 5 is formed as open at the axial end face; on the other hand, the member 5 has a disc-shaped membrane base 13 (see FIG. 1), which represents an axial end face of the membrane 5 and is located outside the sensor housing 2 in the assembled state of the ultrasonic sensor 1. Arranged on the inner side of the membrane base 13 is a piezo element (not represented in the figures), which is connected to a printed circuit board by way of electrical leads 14, 15. By way of the leads 14, 15, electrical voltage can be applied to the piezo element and the membrane 5 can consequently be induced to undergo mechanical vibration. The induced voltage at the piezo element can also be picked up at the leads 14, 15.

As FIG. 1 also reveals, the membrane 5 is clamped by way of the flange 12 between the two housing shells 3, 4, and, to be more precise, within the decoupling element 6. Therefore, apart from the decoupling in terms of vibration, the decoupling element 6 also provides secure fastening of the membrane 5.

The two housing shells 3, 4 of the sensor housing 2 are shown in more detail in FIGS. 2 and 3. The decoupling element 6 is injection-moulded onto an inner surface of the sensor housing 2 or of the respective housing shells 3, 4, and so the decoupling element 6 is also formed by two parts 6a, 6b. The one part 6a of the decoupling element 6 is consequently formed in one piece with the associated, first housing shell 3 or moulded on the inner surface of this housing shell 3. Correspondingly, the other part 6b of the decoupling element 6 is also moulded on the inner surface of the associated second housing shell 4, and consequently provided in one piece with this housing shell 4. Altogether, the decoupling element 6 extends over most of the length region of the sensor housing 2, and in the exemplary embodiment essentially over the entire axial length of the sensor housing 2. The parts 6a, 6b are therefore in principle two halves of the decoupling element 6.

As already stated, the two housing shells 3, 4 are connected to one another by way of the latching means 7. These latching means 7 have on the one hand latching elements or latching lugs 16—these are arranged on the first housing shell 4—and on the other hand corresponding latching recesses 17. If the two housing shells 3, 4 are pressed against one another, the latching lugs 16 engage in the corresponding latching recesses 17, whereby the two housing shells 3, 4 are connected to one another. The first part 6a of the decoupling element 6 then comes into contact with the second part 6b, whereby the sensor housing 2 is also sealed. Formed for this purpose in the first part 6a is a groove or depression 18, in which a corresponding sealing tongue 19 of the second part 6b is received.

The decoupling element 6 has on the end face a first holding region 20, which is designed for holding the membrane 5. Formed in this holding region 20 is a peripheral groove 21, in which an edge region of the flange 12 of the membrane 5 can be received. The fastening takes place in such a way that the flange 12 is first inserted into the one half of the groove 21 of the first part 6a and then the second housing shell 4 is subsequently placed on, and so the remaining region of the flange 12 enters the other half of the groove 21 of the second part 6b.

The first holding region 20 is adjoined in the axial direction by a second holding region 22, which is designed for holding a printed circuit board with electronic components arranged on it (see for example FIG. 5). In the second holding region 22, supporting elements 23, 24 for the printed circuit board, on which the printed circuit board can be supported, are formed on the first part 6a. A component that is arranged on the printed circuit board can be received in a receptacle 25 of the first part 6a or in the first housing shell 3. The same also applies to a receptacle 26, which is formed in the second part 6b of the decoupling element 6.

As FIG. 2 reveals, a multiplicity of metallic, and consequently electrically conducting, connecting bolts 27, by way of which the printed circuit board and the components arranged there can be electrically coupled to the connecting region 8, and thereby to the electronic control device, protrude from the supporting element 24, which is formed in the axial, rear end region of the first part 6a.

As FIGS. 5 to 7 reveal, during the assembly of the ultrasonic sensor 1, the printed circuit board, now denoted by 28, is inserted into the first housing shell in such a way that the printed circuit board 28 extends in the axial direction. The printed circuit board 28 is thereby supported on the aforementioned supporting elements 23, 24. In a following or preceding step, the membrane 5 is received by its flange 12 in the first half of the groove 21 of the first part 6a and held there. Then, the piezo element can be connected to the printed circuit board 28 by way of the leads 14, 15. Subsequently, the second housing shell 4 can be connected to the first housing shell 3, and so the membrane 5 is clamped between the housing shells 3, 4. This results overall in a form-fitting and force-fitting fastening of the membrane 5 in the decoupling element 6, which surrounds the membrane 5 or the flange radially from the outside, and consequently decouples the membrane 5 in terms of vibration from the sensor housing 2. The ultrasonic sensor 1 is shown in the assembled state in FIG. 7.

The invention claimed is:

1. A method for producing an ultrasonic sensor for a motor vehicle by providing a sensor housing, a membrane for emitting and/or receiving ultrasonic signals, and a decoupling element, which is arranged between the sensor housing and the membrane, the method comprising:
   injection-moulding the decoupling element onto an inner surface of the sensor housing; and
   subsequently inserting the membrane into the sensor housing.

2. The method according to claim 1, wherein the sensor housing is formed by two housing shells that are separate from one another and the decoupling element is formed by two separate parts, and wherein a part of the decoupling element is respectively injection-moulded onto the respective inner surfaces of the two housing shells.

3. The method according to claim 2, wherein the insertion of the membrane into the sensor housing comprises the membrane first being inserted into the one housing shell and the two housing shells subsequently being connected to one another, and so the membrane is clamped in place between the two parts of the decoupling element.

4. The method according to claim 2, wherein the two housing shells are connected to one another by way of latching means.

5. The method according to claim 2, wherein by the connection of the housing shells, the membrane is fixed in the sensor housing with a form fit and/or force fit, between the parts on either side of the decoupling element.

6. The method according to claim 2, wherein at least one of the parts of the decoupling element has a seal for sealing a connecting location between the two housing shells.

7. The method according to claim 1, wherein the decoupling element is formed with a first holding region for the force-fitting and/or form-fitting holding of the membrane.

8. The method according to claim 7, wherein the first holding region is formed with a peripheral radial groove, in which a radial edge region of the membrane is received to produce the form fit and/or the force fit.

9. The method according to claim 1, wherein the decoupling element is formed with a second holding region for holding a printed circuit board.

10. An ultrasonic sensor for a motor vehicle, comprising:
    a sensor housing, with a membrane for emitting and/or receiving ultrasonic signals; and
    a decoupling element is arranged between the sensor housing and the membrane,
    wherein the decoupling element is injection-moulded on an inner surface of the sensor housing and the sensor housing has two housing shells that are separate from one another, between which the membrane is clamped in place.

11. A motor vehicle with an ultrasonic sensor according to claim 10.

* * * * *